Oct. 15, 1957     A. H. SUTTON     2,809,464
RODENT EXTERMINATING BLASTING MECHANISM
Filed Jan. 23, 1956
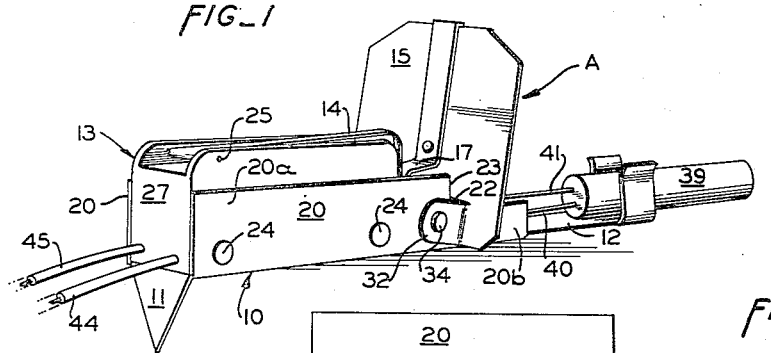
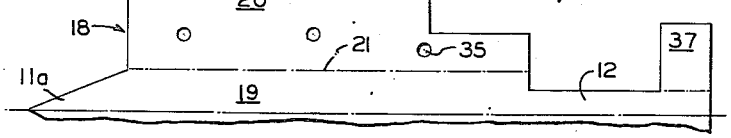
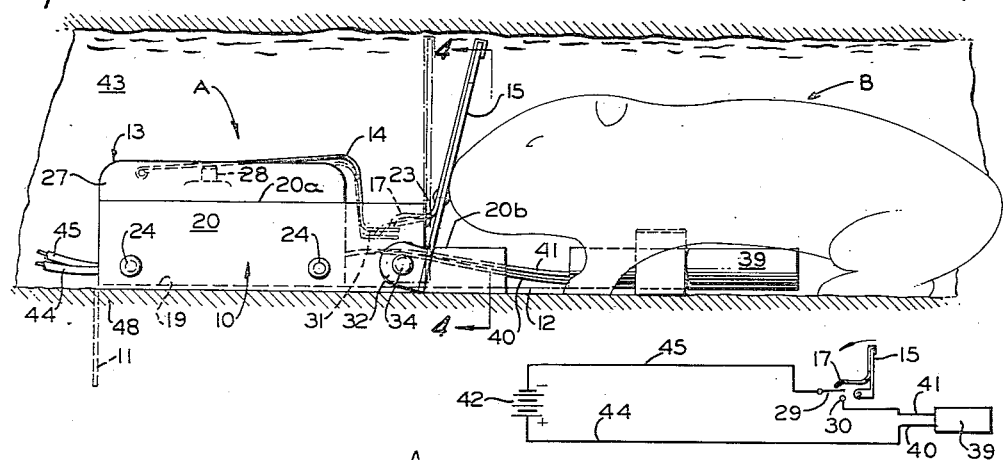
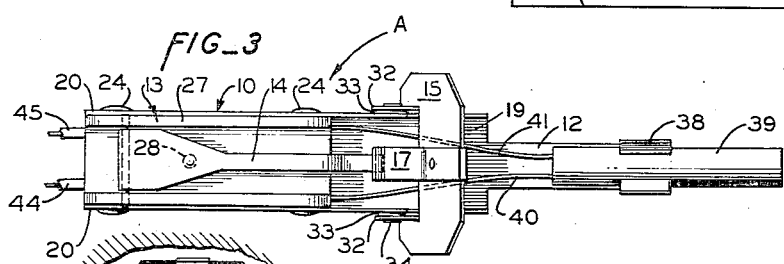
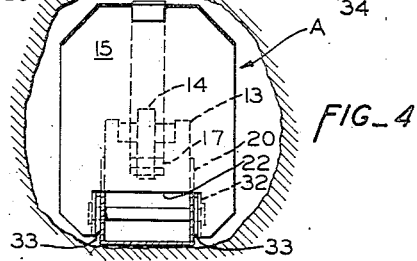
INVENTOR.
ALBERT H. SUTTON
BY
Hansen and Lane
ATTORNEYS United States Patent Office 2,809,464
Patented Oct. 15, 1957

2,809,464

RODENT EXTERMINATING BLASTING MECHANISM

Albert H. Sutton, Santa Cruz, Calif.

Application January 23, 1956, Serial No. 560,488

4 Claims. (Cl. 43—84)

The present invention relates to rodent destroyers and pertains more particularly to a device for blasting gophers and other burrowing type rodents to death in their burrows.

It is well known that gophers and other burrowing type rodents and small animals are very difficult to eliminate once they become established in a field or lawn. These animals cause tremendous damage to lawns and various agricultural crops annually. They are very cunning in avoiding traps and poison, and many previous attempts to exterminate them have met with failure. As used herein the term rodents is intended to include other small burrowing animals.

The present invention contemplates the provision of a simple, electrically energized arrangement for blasting gophers and similar destructive rodents to sudden death in their burrows.

The invention further contemplates the provision of an explosive charge holder with means for electrically detonating the charge when the animal is in a position to be destroyed by a charge mounted in the holder.

Another object of the invention is to provide a simple and effective self-protective explosive type trap for gophers and other burrowing type rodents.

These and other objects of the invention will be apparent from the following description and the accompanying drawings, wherein Fig. 1 is a perspective view of a mechanism embodying the invention ready for insertion in a burrow.

Fig. 2 is an enlarged side elevational view of the mechanism shown in Fig. 1 positioned in a burrow, an animal being indicated in the position in which it would actuate the device for setting off the explosive charge, a trigger element being indicated in set position in solid lines, and in actuated position in broken lines.

Fig. 3 is a plan view of the device illustrated in Figs. 1 and 2.

Fig. 4 is a sectional view taken along line 4—4 of Fig. 2.

Fig. 5 is a plan view of one of two identical half portions of a blank used in making the sheet metal frame member.

Fig. 6 is a diagrammatic view of the electrical circuit employed with the mechanism illustrated in Figs. 1 to 4 inclusive.

Briefly, the device A comprises a channeled sheet metal frame 10 having spade point 11 on its outer end, and having a charge holding arm 12 extending inwardly from its inner end. A conventional micro-switch 13 is fitted into the outer end of the channel frame 10, and has a conventional actuating arm 14 pivotally mounted thereon. A trigger plate 15 is pivotally mounted on the frame 10, and is provided with a finger 17 which overlies the free end of the switch arm 14 for actuating the latter upon a movement of the trigger plate 15 from its solid to its dotted line position of Fig. 2.

Referring to the details of the drawings, the channel frame 10 may be formed from a blank 18, one of the two identical halves of which is shown in Fig. 2. The blank 18 may be of sheet metal, for example, galvanized sheet steel of approximately 20 gauge.

The pointed end portion 11a of the blank 18 is bent downwardly at right angles to a central bottom portion 19 (Fig. 5) of the blank 18 to form the spade point 11 referred to previously herein.

Channel side flanges 20 are bent upwardly at right angles to the channel bottom portion 19 along fold lines 21. The outer end portions 20a of the side flanges 20 are of greater height than the inner end portions 20b thereof, the inner flange portions 20b being of a height to engage the lower edge of a notched out lower portion 22 of the trigger plate 15 in its set or solid line position of Fig. 2 to limit inward swinging of the trigger plate to this set position.

Outward swinging movement of the trigger plate 15 is limited by its engagement with the upright offset edges 23 between the higher outer portions 20a of the frame side flanges 20 and their lower inner portions 20b.

The micro-switch 13 is secured in the outer end portion of the channel frame 10 by rivets 24, and its actuating arm 14 is pivotally mounted on a pin 25 in the upper portion of the microswitch housing 27. The switch actuating arm 14 rides on a usual outwardly spring-pressed actuating button 28. When the switch arm 14 is depressed, it depresses the switch actuating button 28 against the biasing force of its usual spring (not shown) and closes the switch contact points 29 and 30 shown diagrammatically in Fig. 6. Since the structure and operation of micro-switches are well known, and since the details of the micro-switch are not material to the present invention, it will not be described in further detail herein.

The switch actuating arm 14 has an inwardly extending portion 31 on its inner, or free end, and upon this end portion 31 rests the finger 17 rigidly secured to the outer face of the trigger plate 15 to extend outwardly therefrom. The trigger plate 15 is of a size to shield the micro-switch 13 from the force of the blast when the trap is sprung.

A pair of outwardly extending parallel support arms 32 may be formed by bending outwardly the material of the trigger plate 15 removed in making the notch 22 therein. These arms 32 are spaced apart by a distance sufficient to receive the frame side flanges 20 and a pair of spacing washers 33 therebetween. The support arms 32 are pivotally mounted on the pivot pin 34 inserted in the holes 35 (Fig. 5) provided therefor in the channel side flanges 20. The finger 17 is adjusted by bending relative to the trigger plate 15 so that when the trigger plate is in its right hand, or solid line position of Fig. 2, the finger will allow the switch actuating arm 14 to be raised by its biasing spring (not shown) to allow the usual switch contact points 29 and 30 to open, and when the trigger plate 15 is swung to its left hand, or broken line position of Fig. 2, the finger will depress the switch arm sufficiently to close the switch contact points.

The charge holding arm 12 extends inwardly co-planar with the frame bottom portion 19 (Fig. 3). A pair of clip forming ears 37 on the inner end of the arm 12 are bent upwardly and are curved concavely on their inward sides to form a spring clip 38 to receive and retain a conventional electrically detonated blasting cap 39 of a predetermined size when pressed therein.

Blasting caps 39 conventionally are provided with a pair of flexible electrical conductor leads 40 and 41, for connecting the cap to a source of detonating electrical current such as a battery 42 (Fig. 6).

In arranging the mechanism for operation, the battery 42 is placed exteriorly of, but conveniently close to the mouth of a burrow 43 in which the trap is to be set, and one or both of a pair of flexible conductors 44 and 45 for connecting the battery to the device A are left disconnected from the battery to avoid the possibility of premature explosion. A blasting cap 39 of a required size then is inserted in the clip 38 as shown in Figs. 1, 2 and 3. An end of one long flexible conductor 44 is connected to one conductor lead 40 of the blasting cap 39 and the other cap conductor lead 41 is connected to one side of the micro-switch 13. An end of the other long flexible conductor 45 then is connected to the other side of the micro-switch 13.

The device A then is inserted into the burrow 43 preferably as far as one can convienently reach with one's arm, and the spade point 11 is manually pressed down into the floor 48 of the burrow to anchor the device in position. Then, and only then, the outer ends of the long flexible conductors 44 and 45 are connected to the battery 42 exteriorly of the burrow, which completes the setting of the mechanism.

The device A is left in the burrow, and later, when an animal B within the burrow notes that its burrow has been tampered with, it explores the cause. A light push on the inner side of the trigger plate 15 will cause it to swing from its solid to its broken line position of Fig. 2, thereby causing the finger 17 to depress the switch actuating arm 14 and close the switch points 29 and 30. This completes a circuit from the battery 42 through the conductors 44 and 45, the switch contact points 29 and 30, the cap conductor leads 40 and 41 and the cap 39, thereby detonating the cap 39 and killing the animal B which, as shown in Fig. 2, will at that time, be directly over the cap.

Although the body of the animal is mutilated by the blast, its death is practically instantaneous. Therefore, the animal does not suffer for a long period of time as do some animals caught in other types of traps, or when poisoned.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A rodent exterminating blasting device of a size for insertion in an animal burrow of predetermined diameter, comprising a channel frame of sheet metal, a spade point formed on the outer end of the frame and bent downwardly for embedding in the floor of a burrow in which the device is placed, a normally open electrical switch secured in the outer end of the channeled frame, a trigger plate movably mounted transversely across the channel frame inwardly of the switch, means operatively interconnecting the trigger plate and switch for closing the switch upon a predetermined outward movement of the trigger plate, a clip for removably holding an electrical detonating type blasting cap on the inward side of the trigger plate, and means for electrically connecting a blasting cap mounted in the clip through the switch to a battery located exteriorly of a burrow in which the device is placed, whereby a detonating current from the battery is transmitted to the cap upon closing the switch.

2. A rodent exterminating blasting device of a size for insertion in an animal burrow of predetermined diameter, comprising a channel frame of sheet metal having upwardly bent side flanges, portions of the side flanges extending along an outer end portion of the frame being of greater height than the portions of said flanges extending along an inner end portion of the frame, an electrical switch fitted into the channel frame between the outer flange portions, a trigger plate pivotally mounted transversely of the channel frame inwardly adjacent the switch, means operatively interconnecting the trigger plate and switch for closing the switch upon a predetermined outward pivotal movement of the trigger plate by an animal within a burrow in which the device is mounted, a cap holder mounted on the frame inwardly of the trigger plate a distance less than the length of the animal to be exterminated, whereby an animal pressing against the inner side of the trigger plate with its nose will be directly over a blasting cap mounted in said holder, and means for electrically connecting a blasting cap in the holder through the switch to a battery located exteriorly of a burrow in which the device is placed, whereby a detonating current from the battery is transmitted to the cap upon closing the switch.

3. A rodent exterminating blasting device comprising a frame, an electrical switch mounted on one end of the frame, a projection on the other end of the frame, means on the projection for retaining a blasting cap thereon, a trigger plate mounted for limited movement transversely of the frame as a shield between the cap holding means and the switch, and operatively connected to the switch to actuate the latter upon a predetermined movement of the trigger plate, and means for electrically connecting a blasting cap mounted in the cap holding means through the switch to a battery located exteriorly of a burrow in which the device is placed, whereby such blasting cap is detonated upon closing the switch.

4. A rodent exterminating blasting device of a size for insertion in an animal burrow of predetermined diameter, comprising a channel frame of sheet metal having upwardly bent side flanges, the portions of the side flanges extending along an outer end section of the frame being of greater height than the portions of said flanges extending along an inner end portion of the frame, an electrical switch fitted into the channel frame between the outer flange portions, a trigger plate pivotally mounted transversely of the channel frame inwardly of the switch, and of a size to form a loosely fitting partition transversely of a burrow into which the device is inserted, means operatively interconnecting the trigger plate and switch for closing the switch upon a predetermined outward pivotal movement of the trigger plate by an animal within a burrow in which the device is mounted, stop means limiting the outward movement of the trigger plate, a cap holder mounted on the frame inwardly of the trigger plate a distance less than the length of an animal to be exterminated, whereby an animal in the burrow pressing against the inner side of the trigger plate with its nose will be directly over a blasting cap mounted in said holder, and means for electrically connecting a blasting cap in the holder through the switch to a battery located exteriorly of a burrow in which the device is placed, whereby a detonating current from the battery is transmitted to the cap upon closing the switch.

References Cited in the file of this patent

UNITED STATES PATENTS

| 725,883 | Sims | Apr. 21, 1903 |
| 1,432,356 | Pittberg | Oct. 17, 1922 |
| 2,729,017 | Mealey | Jan. 3, 1956 |

OTHER REFERENCES

McBride, "The Colonel Got His Gopher," page 86 of The Explosives Engineer, May–June 1947.